United States Patent [19]

van de Ven

[11] Patent Number: 4,721,361
[45] Date of Patent: Jan. 26, 1988

[54] REAR PROJECTION IMAGE VIEWING SYSTEM

[75] Inventor: Johannes C. van de Ven, Eindhoven, Netherlands

[73] Assignee: U.S. Philips Corporation, New York, N.Y.

[21] Appl. No.: 63,739

[22] Filed: Jun. 17, 1987

Related U.S. Application Data

[63] Continuation of Ser. No. 862,064, May 12, 1986, abandoned.

[30] Foreign Application Priority Data

Jan. 28, 1986 [NL] Netherlands ............................ 8600184

[51] Int. Cl.$^4$ .............................................. G03B 21/60
[52] U.S. Cl. ........................................ 350/128; 355/45
[58] Field of Search ..................... 350/124, 127, 128; 353/74, 75, 77; 352/104; 355/45

[56] References Cited

U.S. PATENT DOCUMENTS

| 2,974,565 | 3/1961 | Miller | 350/128 X |
| 3,832,032 | 8/1974 | Shimada | 350/128 |
| 3,865,484 | 2/1975 | Heldenbrand et al. | 355/45 |
| 4,113,377 | 9/1978 | Sone et al. | 355/45 |
| 4,482,206 | 11/1984 | Van Breemen | 350/128 |
| 4,512,631 | 4/1985 | Van Breemen | 350/128 |

Primary Examiner—Richard A. Wintercorn
Attorney, Agent, or Firm—David R. Treacy

[57] ABSTRACT

A rear-projection system by means of which a high brightness and contrast can be obtained in that the projection screen has a maximum transmission for signal light and ambient light. This is achieved by making the surfaces of the projection-screen anti-reflecting as far as possible. A satisfactory contrast is further guaranteed by ensuring that ambient light which has traversed the screen is absorbed in dark layers inside the enclosure. Further steps may be taken in order to prevent ambient light which is incident on the mirror from being reflected back to the screen.

17 Claims, 7 Drawing Figures

REAR PROJECTION IMAGE VIEWING SYSTEM

This is a continuation of application Ser. No. 862,064, filed May 12, 1986 now abandoned.

BACKGROUND OF THE INVENTION

1. Field of the Invention

The invention relates to a rear-projection system, comprising an enclosure which accomodates at least one image source, a corresponding number of projection-lens systems, and a rear-projection screen.

2. Description of the Prior Art

In a rear-projection system, a projection lens system projects the primary image produced by an image source onto a first side, referred to as the rear, of the projection screen. This image can be observed by a viewer in front of the system, looking toward the second or front side of the screen.

Rear-projection systems comprising one image source in the form of a cathode-ray tube for monochrome reproduction, or three such image sources for color reproduction, are employed for displaying a video program with a picture size which is substantially larger than the size attainable with a conventional television picture tube. The projection system may also be employed for displaying other information, such as visual information associated with speech, messages to visitors of exhibitions, etc. An image source used in the projection system may also comprise a light source and a transparency in the form of a slide or film arranged in front of the light source. Alternatively, an image source may comprise a light source and an electronically controllable flat display device comprising a matrix of picture cells which, depending on the electronic signal, reflect or absorb light, or transmit or absorb light. Such a flat display device for example enables video pictures to be displayed.

The rear-projection arrangements described above are intended for use in an illuminated environment such as a room, an exhibition space or an auditorium. In order to ensure that the projected image has a satisfactory brightness and contrast, a maximum amount of the light produced by the image source, referred as signal light, should be transmitted by the screen, and conversely; a minimal amount of ambient light should be reflected towards the viewers by the screen and other elements of the projection system.

In the rear-projection systems known until now it has been attempted to achieve this by a concentrated emission of signal light from surface portions of the screen and by making the other surface portions light-absorbing. As a result, one portion of ambient lighting impinging on the screen is absorbed, another portion is transmitted into the enclosure, and the remainder is reflected by the screen. An example of such a projection screen is the system described in U.S. Pat. No. 3,832,032. The rear surface of the projection screen used in this system is provided with a large number of cylindrical lenses which extend in a vertical direction, and which concentrate the light originating from the image source(s) in vertical bands on the front of the screen. The stripes between these bands are provided with a light-absorbing layer. This screen provides a substantial increase in the ratio between the signal light emerging from the screen and the ambient light reflected by the screen, as can be observed by the viewer.

However, ambient light which enters the screen via the light-transmitting bands between the light-absorbing stripes can emerge again, for example, as a result of total internal reflection from the inside of the cylindrical lenses. When the light-absorbing material covers 50% of the surface area this effect still results in 10% of the ambient light being reflected. As the light-absorbing material is situated at the front of the screen, this material is exposed to damaging external mechanical and chemical influences.

SUMMARY OF THE INVENTION

It is the object of the present invention to provide a novel and improved type of rear-projection system in which a satisfactory ratio between the signal light emerging from the screen and the reflected ambient light is obtained. In a rear-projection system in accordance with the invention, the projection screen has a maximized transmission for light, and all the elements of the system which are not situated in the radiation path of the signal light, and which can reflect ambient light traversing the screen, are light-absorbing.

The invention is based on recognition that the ambient light can be prevented from being reflected towards the viewing space by allowing the ambient light which is incident on the projection screen to pass through this screen in order to be absorbed inside the housing of the projection system. The absorbing areas at the front of the screen may then be omitted, thus eliminating their inherent disadvantages, such as reduced transmission of signal light and the vulnerability of the screen.

A projection system in accordance with a first embodiment of the invention, in which the projection screen is a single sheet, is characterized in that the back of this sheet has an anti-reflecting surface.

A projection system in accordance with a second embodiment of the invention, in which the projection screen comprises a first sheet carrying light-diffusing elements and a second sheet having a Fresnel-lens structure at the front, is characterized further in that the back of the first sheet and the front and the back of the second sheet have anti-reflecting surfaces.

The anti-reflecting surfaces guarantee a maximum transmission of both the ambient light and signal light. An anti-reflecting surface can be obtained by providing the surface, in any known manner, with a coating comprising a plurality of thin layers of suitably selected refractive indices and thicknesses.

One preferred embodiment is characterized in that the anti-reflecting surface is a mechanically roughened surface coated with a thin layer of constant thickness which follows the shape of the roughened surface. As is described in European Patent Application No. 0,131,341, which has been laid open to public inspection, such a surface has very good anti-reflecting properties over a wide range of wavelengths.

Another preferred embodiment is characterized in that the anti-reflecting surface of the projection screen carries a micro-relief structure whose height differences and distances between the peaks are of the order of 200 to 800 nm.

Such a structure provides a graded transition from the refractive index of the surrounding medium, for example air, to that of the projection-screen material. The anti-reflecting properties of such a structure are far more independent of the direction of incidence and the wavelength of the incident light than more conventional anti-reflection layers.

Another embodiment is characterized in that the anti-reflecting surface of the projection screen is a surface which is roughened by means of ion-implantation and etching. Like the abovementioned micro-relief surface, this surface has a graded refractive index and exhibits the same favorable properties.

The above micro-relief structure is suitably formed by means of a replication process. This process employs a mold having a surface profile which is the inverse of the micro-relief structure to be formed. This mold is filled with a material, in an adequately soft condition, after which the relevant mold surface is pressed onto the material. Subsequently, the material is cured, after which the surface with the cured layer, in which the micro-relief structure is now formed, is removed from the mold. If the relief structure is to be formed on a surface which should also be provided with another structure, such as a structure of light-diffusing elements, for example cylindrical lenses or a Fresnel structure, the micro-relief structure and the other structure may be formed simultaneously in one replication process.

It has been found that the micro-relief structure can be reproduced very accurately from a mold if an ultraviolet-curable material is used.

Preferably, the micro-relief structure of an anti-reflecting surface having such a structure is formed in a layer of an ultraviolet-curable material.

It is also advantageous to form such a micro-relief structure on one or more lens surfaces of a projection lens system to be used in a projection system, in order to make the relevant surface anti-reflecting for signal light and, as the case may be, for any ambient light still reaching this surface. If, as is generally the case, the relevant lens surface is aspheric, this surface is preferably formed by means of a replication process, so that the shape of the lens surface and the micro-relief structure are formed simultaneously in one replication process.

A projection system which employs this possibility is characterized in that at least one surface of a projection-lens system is provided with a micro-relief structure whose height differences and distances between the peaks are of the order of 200 to 800 nm.

A further characteristic feature of a rear-projection system in accordance with the invention is that elements of the system which are not situated in the radiation path of the signal light, and which may reflect ambient light which has passed through the screen, are made light absorbing by means of a matte-black fibre-loaded material.

Such a material is easy to apply and as a result of the irregular surface thus formed it has a high light-absorbing capacity.

In practice, rear-projection systems comprise one or more mirrors in order to fold the light path from the image source(s) to the projection screen, and thereby reduce the dimensions of the cabinet. The screen is an optical element which serves to diffuse the signal light into the viewing space. Conversely, this also means that the screen diffuses a portion of the ambient light which is incident on the screen from the outside towards the folding mirror(s). In order to maintain a high contrast in the projected image, care must be taken that the light reaching the folding mirror(s) from the projection screen is not reflected directly back to the screen by the mirror(s).

To this end, in an embodiment of the invention, a rear-projection system comprising at least one mirror is characterized in that each mirror is arranged in such a way that ambient light which is diffused towards the mirror by the screen is reflected by the mirror in another direction than towards the screen.

Since ambient light is incident from above or horizontally, and the diffusion of light by the screen in a vertical direction is usually limited, this arrangement of the mirror generally does not mean that a normal to the reflecting surface should not intersect the screen.

A rear-projection system in accordance with another embodiment of the invention is characterized in that blinds of a light-absorbing material are arranged between the front surface of the front sheet of the rear-projection screen and the first folding mirror. As inside the cabinet the signal light is incident on the screen at a very limited solid angle, which differs from the angles at which the ambient light is diffused and reflected, the blinds are capable of absorbing substantially all the ambient light inside the cabinet without absorbing much signal light.

In accordance with a preferred embodiment of the invention the blinds comprise a light-absorbing material deposited on the upright sides of a Fresnel lens. This has the advantage that the blinds absorb only signal light which is incident on the upright sides of the Fresnel-lens. Consequently, there is no reduction in brightness. Moreover, it is not necessary to provide a separate structure for supporting the blinds in the enclosure.

BRIEF DESCRIPTION OF THE DRAWINGS

Embodiments of the invention will now be described in more detail, by way of example, with reference to the drawings, in which FIG. 1 schematically shows a rear-projection system in accordance with an embodiment of the invention.

DESCRIPTION OF THE PREFERRED EMBODIMENTS

Figure 1:
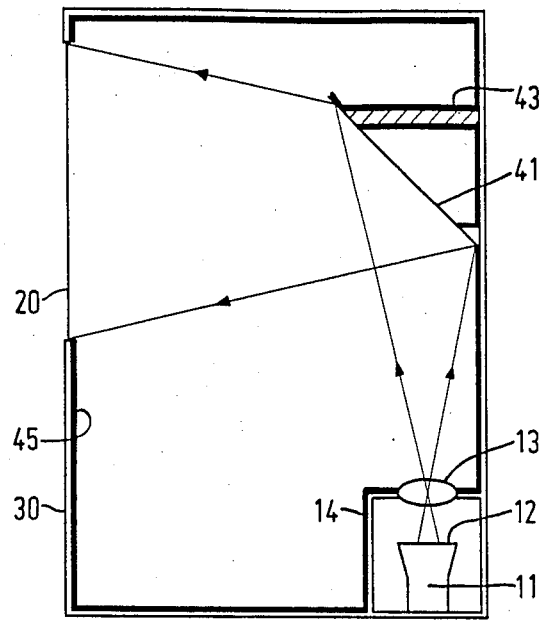

In FIG. 1 a picture or scene is displayed on the screen 12 of a cathode-ray tube 11. The light emitted by this image source is projected onto the rear of a rear-projection screen 20 by the projection lens system 13, represented as a single lens, via a mirror 41. Instead of a single cathode-ray tube 11 for monochrome reproduction it is possible to employ a plurality of cathode-ray tubes with an equal number of projection-lens systems for color reproduction of a picture or the scene. Alternatively, the image source may comprise a light source and a transparency, for example a slide or flim, arranged between the light source and the lens system. It is also possible that the image source comprises a flat display device comprising a matrix of picture cells which, depending on electronic signals, reflects or absorb light or transmit or absorb light, and a light source.

Both the image source(s) and the projection screen 20 are arranged in an enclosure 30 in which no further openings are formed through which light can enter. The image source(s) is (are) arranged in a separate compartment 14 of the cabinet 30.

In the enclosure a mirror 41 is mounted to that the light path from the picture source to the screen can be longer than the linear dimensions of the enclosure. This mirror is mounted by means of supports 43. The use of a plurality of folding mirrors enables the dimensions of the enclosure to be reduced even further.

In accordance with the invention the inner surfaces of the enclosure, the mounts and the mirror supports are made highly light-absorbing. This may be effected, for example, by providing them with an absorbing layer 45 of a commercially available fiber loaded matte-black material which absorbs substantially all the incident light and which diffuses the small amount of residual light in all directions. Moreover, the projection screen is given a maximum transmission for ambient light.

Figure 2A:
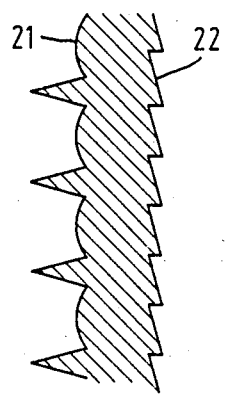
FIGS. 2a and 2b show two projection screens for the projection system in accordance with the invention.
Figure 2B:
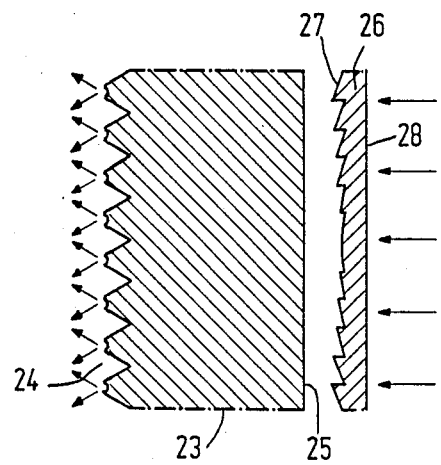

FIGS. 2a and 2b show two examples of the projection screen 20. FIG. 2a shows a projection screen made of only one sheet. The front 21 is provided with light-diffusing elements of a type already known. The back 22 of the sheet has a Fresnel-lens structure. This Fresnel-lens structure directs the diverging beam from the image source in a forward direction as a parallel beam. The back is made anti-reflecting, for example, in that on the Fresnel faces a micro-relief structure is formed. The height differences and the distances between the peaks of this structure are of the order of 200 to 800 nm. For further details on such a micro-relief structure, also referred to as a "moth's eye" structure, reference is made to "Optica Acta", 1982, Vol. 29, no. 7, pages 993–1009.

Such a structure may be formed by means of, for example, a replication process simultaneously with the formation of the Fresnel-lens structure. For this purpose a mold having a back surface profile which is the inverse of the desired Fresnel-lens and micro-relief structure is filled with a material which is in a sufficiently soft condition, after which the back is pressed onto this material. Subsequently, the material is allowed to cure, after which the sheets with the cured layer with the Fresnel-lens structure and the micro-relief structure are removed from the mold. Preferably, use is made of an ultraviolet-curable material. It has been found that the micro-relief structure can be reproduced very accurately with such a material.

FIG. 2b shows a rear-projection screen comprising two sheets. The front sheet 23 carries light-diffusing elements at its front surface 24. The back 25 is plane and anti-reflecting. The rear sheet 26 carries a Fresnel-lens structure at its front surface 27, its back 28 also being a plane. Both the front 27 and the back 28 are made anti-reflecting, for example by providing a micro-relief structure in the manner described above. Another possibility of making the various surfaces anti-reflecting, is the vapor deposition of a thin layer of $MgF_2$. A particularly favorable effect is obtained when the surface is first roughened, after which a layer of $MgF_2$ of constant thickness which accurately follows the irregularities is applied.

The shapes of the light-diffusing elements shown in FIGS. 2a and 2b should be regarded as examples. In the literature a large number of possibililities are described from which a choice can be made, the criteria being, inter alia, the light distribution in a horizontal and vertical direction, the color reproduction in the case of different image sources for different colors, and the brightness distribution over the projection screen.

Figure 3A:
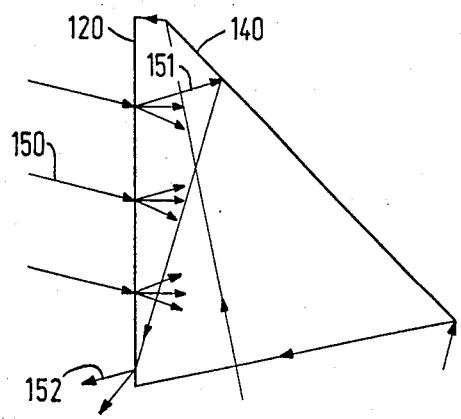
FIGS. 3a, 3b, 3c and 3d illustrate further steps for supressing ambient light.

FIGS. 3a, 3b, 3c and 3d show further steps for suppressing ambient light. FIG. 3a schematically shows a rear-projection screen 120 behind which a mirror 140 is arranged. Ambient light, as is indicated by the arrows 150, is incident on the front of the screen 120 and is diffused in the projection system by the light-diffusing elements in the screen. A part of the ambient light thus diffused, indicated by the arrows 151, is incident on the mirror and is reflected directly to the screen. This light, indicated by the reference numeral 152, emerges from the front of the screen and at specific angles it gives rise to a substantial degradation of the image quality.

Figure 3B:
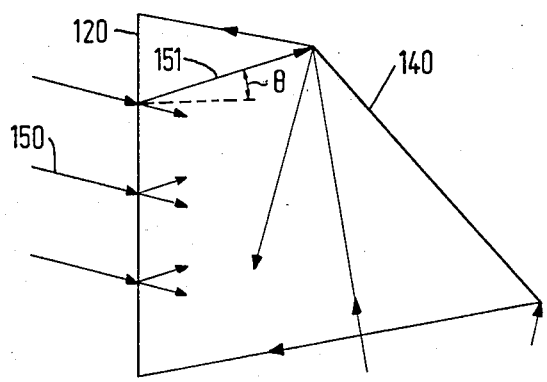

In FIG. 3b the mirror 140 is situated further from the screen 120, so that the ambient light reflected by the mirror cannot reach the screen but is absorbed in the enclosure wall. Thus, the image quality is not degraded by the reflected ambient light.

It is to be noted that the extent to which the ambient light reflected to the screen by the mirrors affects the image quality depends to a considerable degree on the direction from which the ambient light is incident on the screen, and on the light-diffusing action of the screen for light which does not originate from the image source. Since ambient light will generally originate from light sources which are situated at the same level as, or higher than, the projection system and the light-diffusing action of the projection screen in a vertical direction is limited, it is not necessary in practice to allow for light which is diffused inside the enclosure and which is directed upwards at an angle larger than 30° to the horizontal. In FIG. 3b this angle in indicated by $\theta$.

If the enclosure accomodates a plurality of mirrors, it is obvious that the above considerations apply to each of the mirrors individually. Moreover, care must be taken that the ambient light which enters through the screen cannot reach the screen again via a light path in which a plurality of mirrors are situated. This may be ensured by, for example, folding the light path so that it has a zig-zag shape.

Figure 3C:
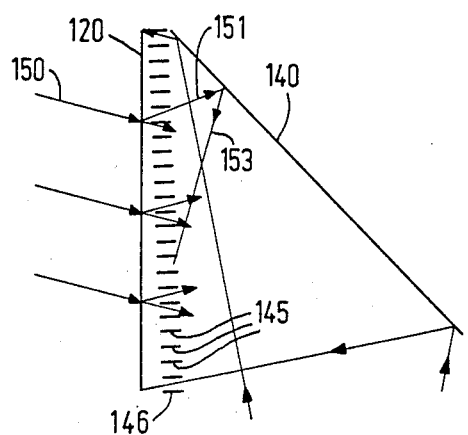

Another method of absorbing annoying ambient light is illustrated in FIG. 3c. In the same way as in the preceding figures the beam of signal light is projected onto the rear-projection screen 120 via a folding mirror 140. Between the screen and the mirror a series of horizontal light-absorbing elongate elements (slats) 145 are arranged above one another, forming blinds 146. The ambient light diffused in the enclosure, which is again indicated by the arrows 151, is partly absorbed by the upper sides and lower sides of these blinds. The residual light which is incident on the mirror and is therefore reflected towards the screen, as is indicated by the arrows 153, is then given such a direction that it must be absorbed in the blinds 146.

It is obvious that the blinds should be as small as possible in order to minimize absorption of signal light. Moreover, care must be taken that the construction is not arranged in the path of the light from the image source of the mirror.

Figure 3D:
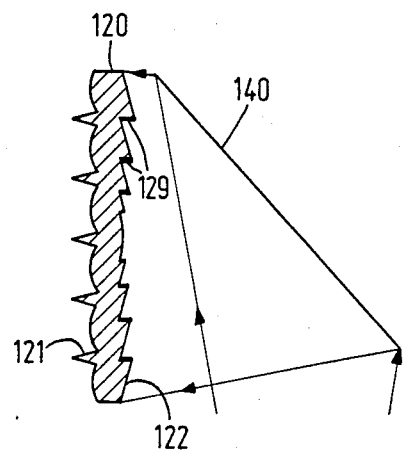

FIG. 3d shows a suitable construction for the blinds. For the sake of clarity the elements of the screen 120 are shown to a considerably enlarged scale relative to the other elements of the system. The screen has a front surface 121 with light-diffusing elements. The back 122 has a Fresnel-lens structure whose upright sides are each provided with a light-absorbing layer 129. These light-absorbing layer together constitute the blinds. This construction has two advantages. First of all, no additional signal light is absorbed, and even signal light which is refracted in a wrong direction by the Fresnel structure is absorbed. Secondly, it does not require a separate means for supporting the blinds. Obviously, making the upright sides of the Fresnel-lens structure light-absorbing is not limited to a projection screen as shown in FIG. 3c, but this may be applied to any other projection screen using a Fresnel-lens structure.

What is claimed is:

1. In a rear projection system comprising:
an enclosure having an opening;
a rear projection screen connected to said enclosure and having a rear surface and a front surface, for transmitting light impinging on said rear surface to said front surface, said light passing through said opening, wherein said screen includes means for diffusing said light and is arranged such that at least a portion of ambient light impinging on said front surface is transmitted into said enclosure; and
at least one image source and at least one projection device in said enclosure, said projection device being arranged to project light from said image source onto said rear surface;
the improvement wherein said rear projection screen has a maximum transmissivity for said ambient light;
said rear projection screen further has at least one anti-reflecting surface; and
said system includes means for preventing ambient light, transmitted through said screen, from being reflected back onto said anti-reflecting surface.

2. A system as claimed in claim 1, wherein said means for diffusing comprises a first sheet having light-diffusing elements, and said screen comprises a second sheet with a surface having a Fresnel-lens structure; and
wherein at least one surface of said first sheet and at least one surface of said second sheet are anti-reflecting surfaces.

3. A system as claimed in claim 2, wherein the anti-reflecting surface of said second sheet has a micro-relief structure having height differences and distances between peaks of the order of 200 to 800 nm.

4. A system as claimed in claim 3, wherein said micro-relief structure is formed in a layer of an ultraviolet-curable material.

5. A system as claimed in claim 2, wherein at least one of the anti-reflecting surfaces is a mechanically roughened surface having a roughened profile coated with a thin layer of constant thickness conforming to said profile.

6. A system as claimed in claim 2, wherein at least one of said anti-reflecting surfaces is a surface roughened by ion-implantation and etching.

7. A system as claimed in claim 2, wherein light from said image source travels along a predetermined path to said projection screen;
said device comprises at least one mirror for folding said light path, and
said means for preventing comprises light absorbing blinds arranged between said screen and said mirror.

8. A system as claimed in claim 7, wherein said Fresnel-lens structure has upright sides; and
said blinds comprise light-absorbing material deposited on said upright sides.

9. A system as claimed in claim 8, wherein said Fresnel-lens structure is formed on the front surface of said second sheet.

10. A system as claimed in claim 1, wherein said projection device comprises a projection lens, and at least one surface of said projection lens has a micro-relief structure having height differences and distances between peaks of the order of 200 to 800 nm.

11. A system as claimed in claim 1, wherein said projection screen comprises a single sheet having a front surface and a rear surface; and wherein said anti-reflecting surface is said rear surface.

12. A system as claimed in claim 1, wherein light travels from said image source to said projection screen along a predetermined light path;
said rear projection system comprises light reflecting elements situated outside of said light path; and
said means for preventing comprises matte-black fiber-loaded material applied to said elements, whereby said elements are made light absorbing.

13. A system as claimed in claim 1, wherein light travels along a predetermined light path from said image source to said projection screen;
further comprising at least one mirror for folding said light path and for reflecting ambient light, diffused toward said mirror by said rear projection screen, away from said rear projection screen.

14. In a rear projection system comprising:
an enclosure having an opening;
a rear projection screen connected to said enclosure and having a rear surface and a front surface, for transmitting light impinging on said rear surface to said front surface said light passing through said opening, wherein said screen includes means for diffusing said light and is arranged such that at least a portion of ambient light impinging on said front surface is transmitted into said enclosure; and
at least one image source and at least one projection device in said enclosure, said projection device being arranged to project light from said image source along a path onto said rear surface;
the improvement wherein said rear projection screen has a maximum transmissivity for said ambient light, and includes at least one anti-reflecting surface; and
wherein said system includes light absorbing surfaces for absorbing ambient light transmitted through said screen, said surfaces covering substantially all elements of the system disposed outside said light path which are positioned such that said elements could reflect ambient light transmitted through the screen.

15. A system as claimed in claim 14, wherein said light absorbing surfaces are formed by matte black fiber loaded material applied to said elements.

16. A system as claimed in claim 14, further comprising at least one mirror for folding said light path and for reflecting ambient light, diffused toward said mirror by said screen, away from said screen.

17. A system as claimed in claim 14, wherein
said device comprises at least one mirror for folding said light path, and
said system comprises light absorbing blinds arranged between said screen and said mirror.

* * * * *